US011782893B2

(12) United States Patent
Kondamudi et al.

(10) Patent No.: US 11,782,893 B2
(45) Date of Patent: *Oct. 10, 2023

(54) METHOD AND SYSTEM FOR PERFORMING UNIFICATION OF DATA OF USERS ACROSS MULTIPLE COMMUNICATION DEVICES IN A SHARDED ENVIRONMENT

(71) Applicant: WizRocket Inc., Mountain View, CA (US)

(72) Inventors: Suresh Kondamudi, Mumbai (IN); Jude Benedict Pereira, Powai (IN)

(73) Assignee: WizRocket Inc., Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/644,550

(22) Filed: Dec. 15, 2021

(65) Prior Publication Data

US 2023/0185787 A1    Jun. 15, 2023

(51) Int. Cl.
*G06F 16/22* (2019.01)
*G06F 16/27* (2019.01)

(52) U.S. Cl.
CPC ............ *G06F 16/22* (2019.01); *G06F 16/278* (2019.01)

(58) Field of Classification Search
CPC ............................... G06F 16/22; G06F 16/278
See application file for complete search history.

(56) References Cited

U.S. PATENT DOCUMENTS

| 11,334,548 B2* | 5/2022 | Kuimelis | G06F 16/2272 |
| 11,509,709 B1* | 11/2022 | Basak | H04L 9/3297 |
| 11,650,981 B1 | 5/2023 | Kondamudi et al. | |
| 2012/0271909 A1 | 10/2012 | Huang et al. | |
| 2015/0281104 A1* | 10/2015 | Golshan | H04L 47/125 370/238 |
| 2017/0004324 A1* | 1/2017 | Seo | H04L 9/008 |
| 2017/0060957 A1 | 3/2017 | Saladi et al. | |
| 2017/0295246 A1 | 10/2017 | Georgiou et al. | |
| 2020/0057752 A1 | 2/2020 | Tofano | |
| 2020/0396072 A1* | 12/2020 | Maurer | G06F 16/2379 |
| 2020/0410025 A1* | 12/2020 | Arunmozhi | G06F 16/9536 |
| 2022/0019995 A1* | 1/2022 | Ngo | G06Q 20/385 |

* cited by examiner

*Primary Examiner* — Richard L Bowen
(74) *Attorney, Agent, or Firm* — Kolisch Hartwell, P.C.

(57) ABSTRACT

The present disclosure provides a method and system for performing unification of data of one or more users across a plurality of communication devices in a plurality of shards. A user unification system receives a first set of data. In addition, the user unification system maps the first set of data to a first natural number. Further, the user unification system assigns a first shard index to the first set of data. Furthermore, the user unification system obtains a second set of data. Moreover, the user unification system maps the second set of data to a second natural number. Also, the user unification system unifies the first natural number and the second natural number. Also, the user unification system assigns the first shard index to the second set of data associated with a first user of the one or more users.

15 Claims, 6 Drawing Sheets

METHOD AND SYSTEM FOR PERFORMING UNIFICATION OF DATA OF USERS ACROSS MULTIPLE COMMUNICATION DEVICES IN A SHARDED ENVIRONMENT

TECHNICAL FIELD

The present invention relates to the field of database management and, in particular, relates to a method and system for performing unification of data of users across multiple communication devices in a sharded environment.

INTRODUCTION

Over the past few years, online platforms have become a popular way for individuals and consumers to interact online. The online platforms have been used to provide range of services to individuals on the Internet. The range of services are such as marketplaces, search engines, social media, consumer business, financial services, industrial products, home services, legal services, creative services, e-learning services, and the like. In addition, the online platforms facilitate interactions between at least two or more distinct individuals (whether firms or consumers) through the range of services via the Internet. We have seen an increasing demand in the usage of the online platforms. The individuals access the online platforms through network-enabled computing devices. In addition, each of the individuals uses multiple network-enabled computing devices to access the online platforms. Further, management and storage of data associated with the individuals and the multiple network-enabled computing devices becomes essential for the online platforms. However, as number of the individuals and the network-enabled computing devices increases, management of the data becomes complex. In addition, the present systems and methods for performing unification of data of the individuals across the multiple network-enabled computing devices use hashing technique. In addition, the present systems and methods may store profile data associated with same computing device before identification and after identification in different shards. Further, the present systems and methods for performing unification of data of the individuals across the multiple network-enabled computing devices are inefficient. Furthermore, the present systems and methods for performing unification of data of the individuals across the multiple network-enabled computing devices are ineffective.

SUMMARY

In a first example, a computer-implemented method is provided. The computer-implemented method for performing unification of data of one or more users across a plurality of communication devices in a plurality of shards. The computer-implemented method includes a first step to receive a first set of data associated with a first device of a first set of communication devices at a user unification system with a processor. In addition, the computer-implemented method includes a second step to map the first set of data associated with the first device of the first set of communication devices to a first natural number of a plurality of natural numbers. Further, the computer-implemented method includes a third step to assign a first shard index of a plurality of shard indexes to the first set of data associated with the first device of the first set of communication devices based on the first natural number. Furthermore, the computer-implemented method includes a fourth step to obtain a second set of data associated with a first user of the one or more users. Moreover, the computer-implemented method includes a fifth step to map the second set of data associated with the first user of the one or more users to a second natural number of the plurality of natural numbers. Also, the computer-implemented method includes a sixth step to unify the first natural number and the second natural number to identify and associate the first device of the first set of communication devices with the first user of the one or more users. Also, the computer-implemented method includes a seventh step to assign the first shard index of the plurality of shard indexes to the second set of data associated with the first user of the one or more users. Also, the first set of communication devices is associated with the first user of the one or more users. Also, the first set of data corresponds to device identity of the first device of the first set of communication devices. Also, the first natural number of the plurality of natural numbers is mapped for the first device of the first set of communication devices using an increment sequence method. Also, the first shard index of the plurality of shard indexes facilitates storing of the first set of data in corresponding shard of the plurality of shards based on shard indexing process. Also, the first user of the one or more users utilizes the first set of communication devices to access one or more online platforms. Also, the second set of data corresponds to personal identity of the first user of the one or more users. Also, the second natural number of the plurality of natural numbers is mapped for the first user of the one or more users using the increment sequence method. Also, the first shard index of the plurality of shard indexes facilitates storing of the second set of data in corresponding shard of the plurality of shards based on shard indexing process.

In an embodiment of the present disclosure, the first set of data includes mobile equipment identifier (MEID), international mobile equipment identity (IMEI), and electronic serial number (ESN). In another embodiment of the present disclosure, the first set of data includes international mobile subscriber identity (IMSI), media access control address (MAC address), and internet protocol address.

In an embodiment of the present disclosure, the second set of data includes name data, age data, electronic mail identity data, folio number data, policy identity data, unique user identity data, contact number data, gender data, geographical location data, and demographical data.

In an embodiment of the present disclosure, the one or more online platforms include an over-the top media platform, an e-commerce platform, a fintech platform, and a social media platform. In another embodiment of the present disclosure, the one or more online platforms include a health platform, an educational platform, a real estate and housing platform, and a travel platform.

In an embodiment of the present disclosure, the increment sequence method enables generation of a natural number of the plurality of natural numbers in incremented way in a number sequence. In addition, the increment sequence method enables the user unification system to automatically map the first set of data and the second set of data in real-time.

In an embodiment of the present disclosure, shard indexing process enables the user unification system to store the first set of data associated with the first device of the first set of communication devices and the second set of data associated with the first user of the one or more users in same shard of the plurality of shards. In addition, shard indexing process utilizes modulo operation on the first set of data and the second set of data for allocating corresponding shard of the plurality of shards.

In an embodiment of the present disclosure, the user unification system fetches a third set of data associated with at least one other communication device of the first set of communication devices. In addition, the third set of data corresponds to device identity of the at least one other communication device of the first set of communication devices. Further, the user unification system maps the third set of data associated with the at least one other communication device of the first set of communication devices to a third natural number of the plurality of natural numbers. Furthermore, the third natural number of the plurality of natural numbers is mapped for the at least one other communication device of the first set of communication devices using the increment sequence method. Moreover, the user unification system unifies the third natural number with the first natural number and the second natural number to identify and associate the at least one other communication device of the first set of communication devices with the first user of the one or more users. Also, the user unification system assigns the first shard index of the plurality of shard indexes to the third set of data associated with the at least one other communication device of the first set of communication devices. Also, the first shard index of the plurality of shard indexes facilitates storing of the third set of data in corresponding shard of the plurality of shards based on shard indexing process.

In a second example, a computer system is provided. The computer system includes one or more processors, a signal generator circuitry embedded inside a computing device for generating a signal, and a memory. The memory is coupled to the one or more processors. The memory stores instructions. The instructions are executed by the one or more processors. The execution of the instructions causes the one or more processors to perform a method for performing unification of data of the one or more users across the plurality of communication devices in the plurality of shards. The method includes a first step to receive the first set of data associated with the first device of the first set of communication devices at the user unification system. In addition, the method includes a second step to map the first set of data associated with the first device of the first set of communication devices to the first natural number of the plurality of natural numbers. Further, the method includes a third step to assign the first shard index of the plurality of shard indexes to the first set of data associated with the first device of the first set of communication devices based on the first natural number. Furthermore, the method includes a fourth step to obtain the second set of data associated with the first user of the one or more users. Moreover, the method includes a fifth step to map the second set of data associated with the first user of the one or more users to the second natural number of the plurality of natural numbers. Also, the method includes a sixth step to unify the first natural number and the second natural number to identify and associate the first device of the first set of communication devices with the first user of the one or more users. Also, the method includes a seventh step to assign the first shard index of the plurality of shard indexes to the second set of data associated with the first user of the one or more users. Also, the first set of communication devices is associated with the first user of the one or more users. Also, the first set of data corresponds to device identity of the first device of the first set of communication devices. Also, the first natural number of the plurality of natural numbers is mapped for the first device of the first set of communication devices using the increment sequence method. Also, the first shard index of the plurality of shard indexes facilitates storing of the first set of data in corresponding shard of the plurality of shards based on shard indexing process. Also, the first user of the one or more users utilizes the first set of communication devices to access the one or more online platforms. Also, the second set of data corresponds to personal identity of the first user of the one or more users. Also, the second natural number of the plurality of natural numbers is mapped for the first user of the one or more users using the increment sequence method. Also, the first shard index of the plurality of shard indexes facilitates storing of the second set of data in corresponding shard of the plurality of shards based on shard indexing process.

In an embodiment of the present disclosure, the first set of data includes mobile equipment identifier (MEID), international mobile equipment identity (IMEI), and electronic serial number (ESN). In another embodiment of the present disclosure, the first set of data includes international mobile subscriber identity (IMSI), media access control address (MAC address), and internet protocol address.

In an embodiment of the present disclosure, the second set of data includes name data, age data, electronic mail identity data, contact number data, folio number data, policy identity data, unique user identity data, gender data, geographical location data, and demographical data.

In an embodiment of the present disclosure, the one or more online platforms include the over-the top media platform, the e-commerce platform, the fintech platform, and the social media platform. In another embodiment of the present disclosure, the one or more online platforms include the health platform, the educational platform, the real estate and housing platform, and the travel platform.

In an embodiment of the present disclosure, the increment sequence method enables generation of the natural number of the plurality of natural numbers in incremented way in the number sequence. In addition, the increment sequence method enables the user unification system to automatically map the first set of data and the second set of data in real-time.

In an embodiment of the present disclosure, shard indexing process enables the user unification system to store the first set of data associated with the first device of the first set of communication devices and the second set of data associated with the first user of the one or more users in same shard of the plurality of shards. In addition, shard indexing process utilizes modulo operation on the first set of data and the second set of data for allocating corresponding shard of the plurality of shards.

In an embodiment of the present disclosure, the user unification system fetches a third set of data associated with at least one other communication device of the first set of communication devices. In addition, the third set of data corresponds to device identity of the at least one other communication device of the first set of communication devices. Further, the user unification system maps the third set of data associated with the at least one other communication device of the first set of communication devices to a third natural number of the plurality of natural numbers. Furthermore, the third natural number of the plurality of natural numbers is mapped for the at least one other communication device of the first set of communication devices using the increment sequence method. Moreover, the user unification system unifies the third natural number with the first natural number and the second natural number to identify and associate the at least one other communication device of the first set of communication devices with the first user of the one or more users. Also, the user unification system assigns the first shard index of the plurality of shard indexes to the third set of data associated with the at least one other communication device of the first set of communication devices. Also, the first shard index of the plurality of shard indexes facilitates storing of the third set of data in corresponding shard of the plurality of shards based on shard indexing process.

In a third example, a non-transitory computer-readable storage medium is provided. The non-transitory computer-readable storage medium encodes computer executable instructions that, when executed by at least one processor, performs a method for performing unification of data of the one or more users across the plurality of communication devices in the plurality of shards. The method includes a first step to receive the first set of data associated with the first device of the first set of communication devices. In addition, the method includes a second step to map the first set of data associated with the first device of the first set of communication devices to the first natural number of the plurality of natural numbers. Further, the method includes a third step to assign the first shard index of the plurality of shard indexes to the first set of data associated with the first device of the first set of communication devices based on the first natural number. Furthermore, the method includes a fourth step to obtain the second set of data associated with the first user of the one or more users. Moreover, the method includes a fifth step to map the second set of data associated with the first user of the one or more users to the second natural number of the plurality of natural numbers. Also, the method includes a sixth step to unify the first natural number and the second natural number to identify and associate the first device of the first set of communication devices with the first user of the one or more users. Also, the method includes a seventh step to assign the first shard index of the plurality of shard indexes to the second set of data associated with the first user of the one or more users. Also, the first set of communication devices is associated with the first user of the one or more users. Also, the first set of data corresponds to device identity of the first device of the first set of communication devices. Also, the first natural number of the plurality of natural numbers is mapped for the first device of the first set of communication devices using the increment sequence method. Also, the first shard index of the plurality of shard indexes facilitates storing of the first set of data in corresponding shard of the plurality of shards based on shard indexing process. Also, the first user of the one or more users utilizes the first set of communication devices to access the one or more online platforms. Also, the second set of data corresponds to personal identity of the first user of the one or more users. Also the second natural number of the plurality of natural numbers is mapped for the first user of the one or more users using the increment sequence method. Also, the first shard index of the plurality of shard indexes facilitates storing of the second set of data in corresponding shard of the plurality of shards based on shard indexing process.

BRIEF DESCRIPTION OF THE DRAWINGS

Figure 1:
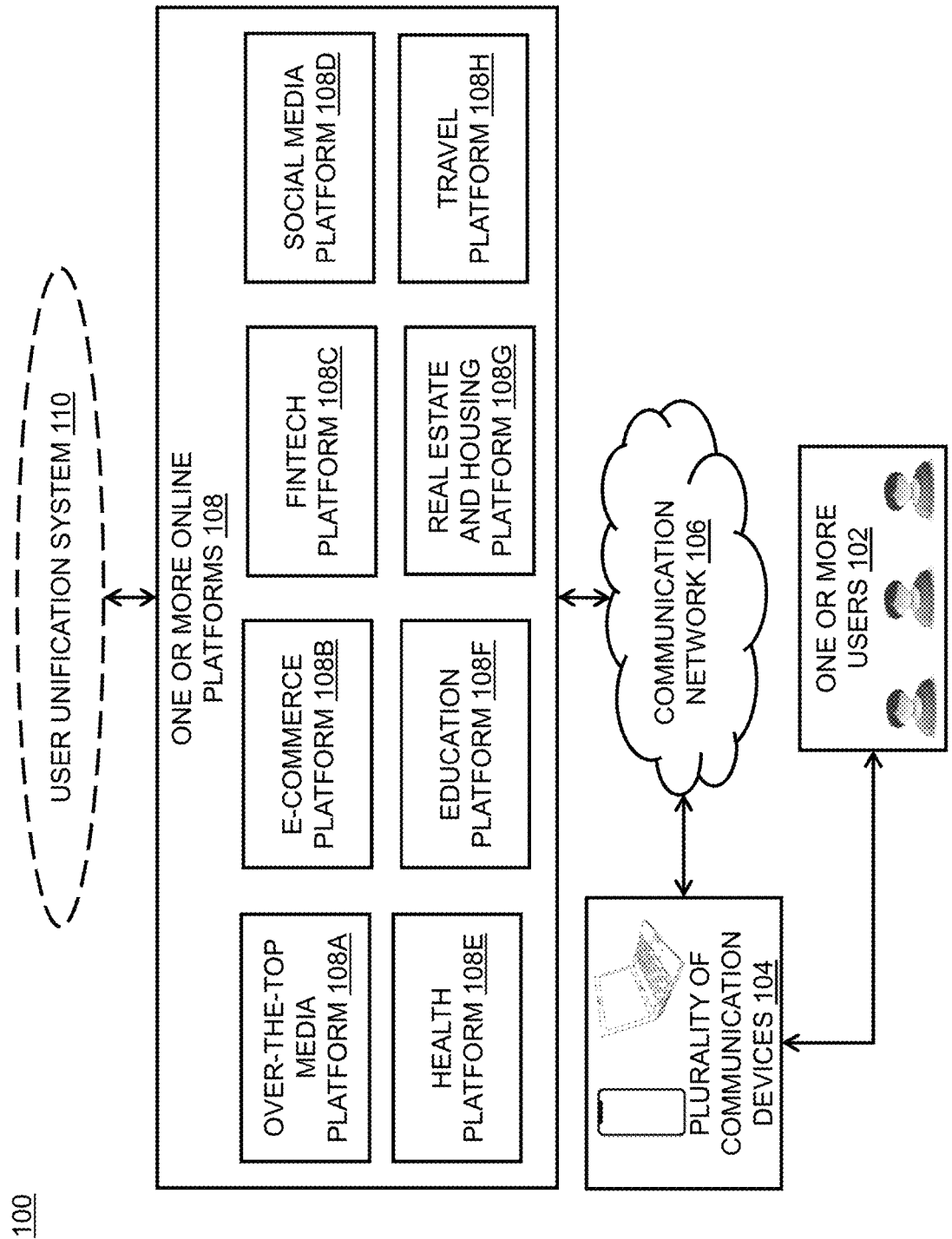
Figure 2:
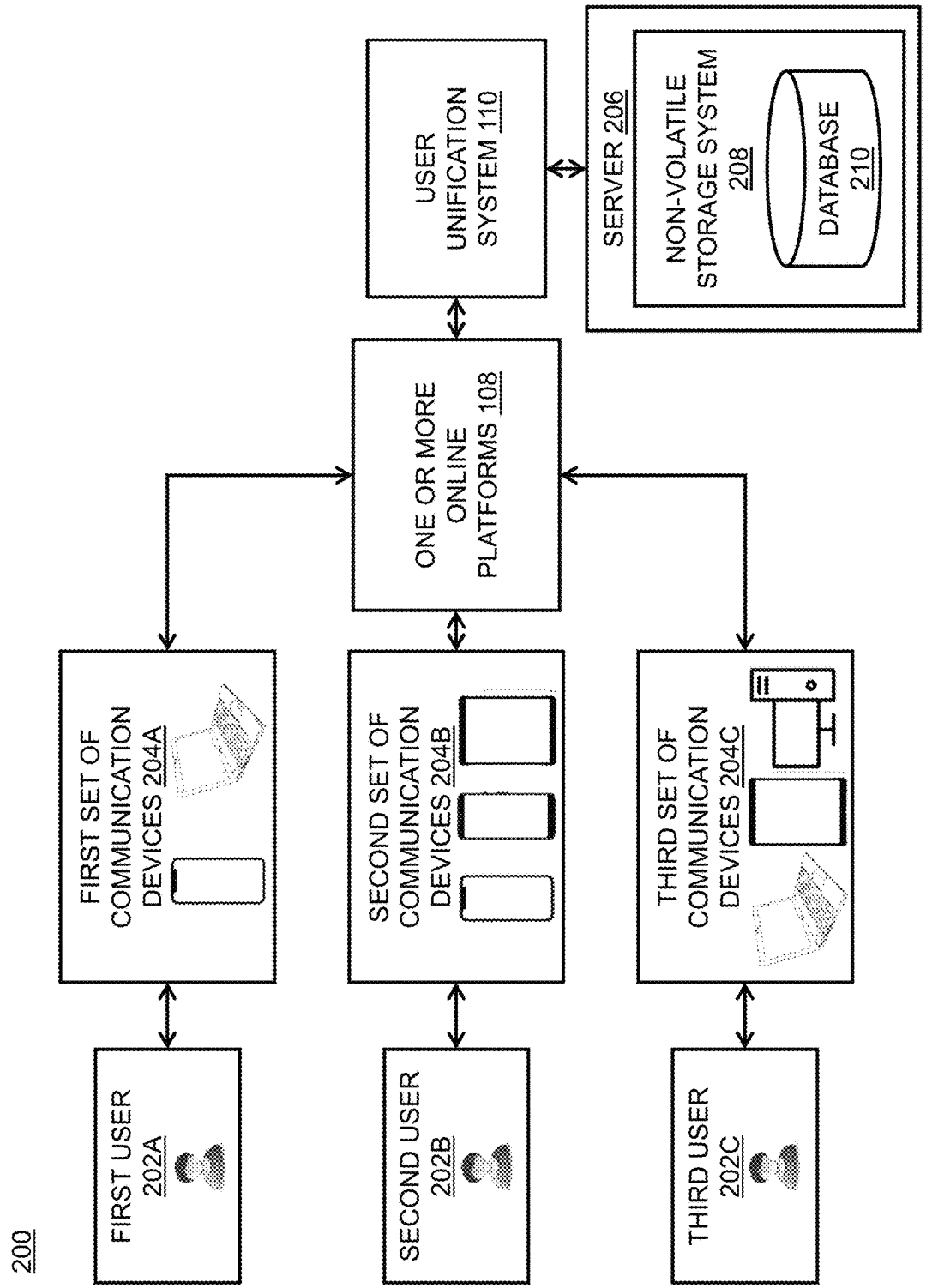
Figure 3:
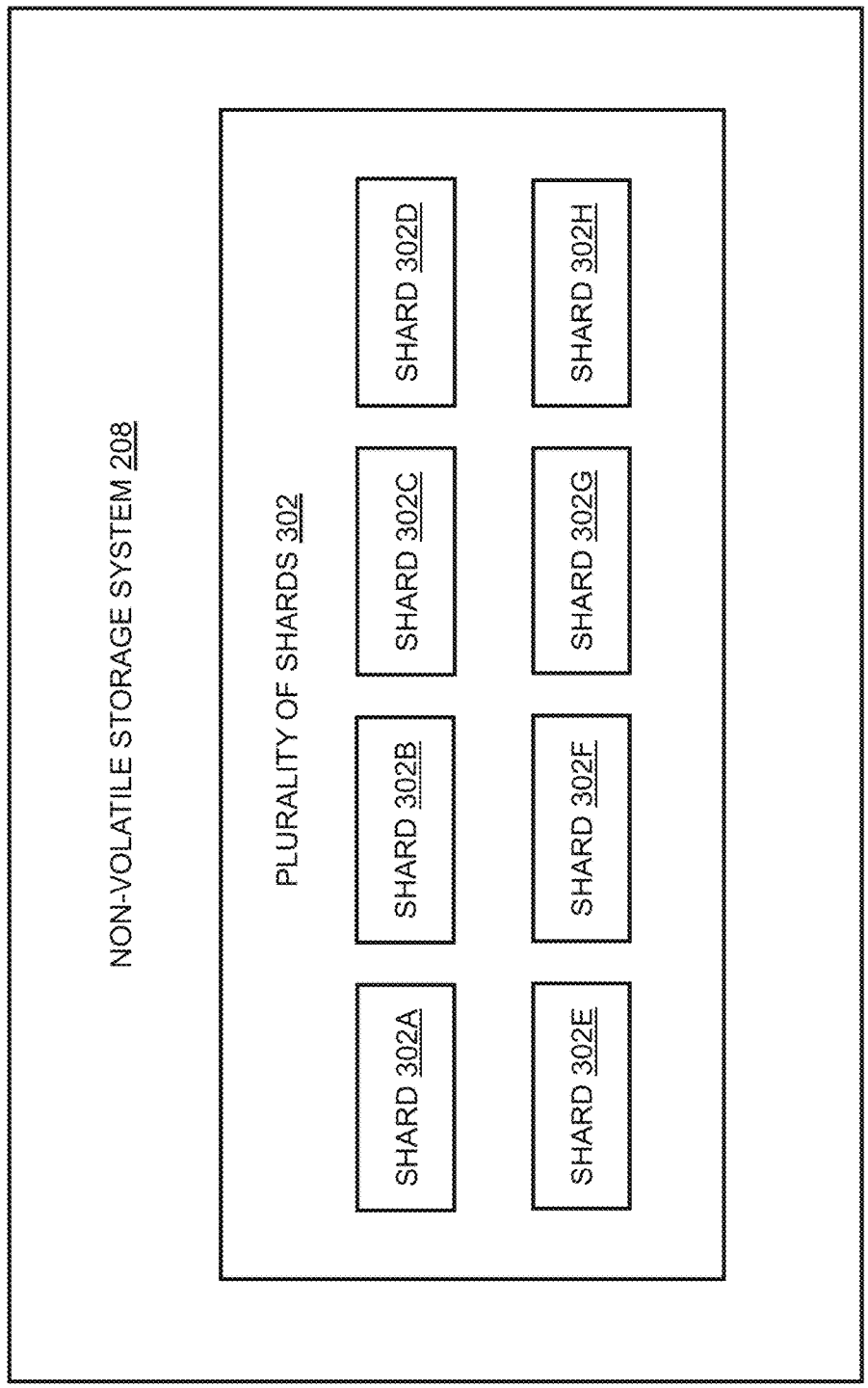
Figure 4A:
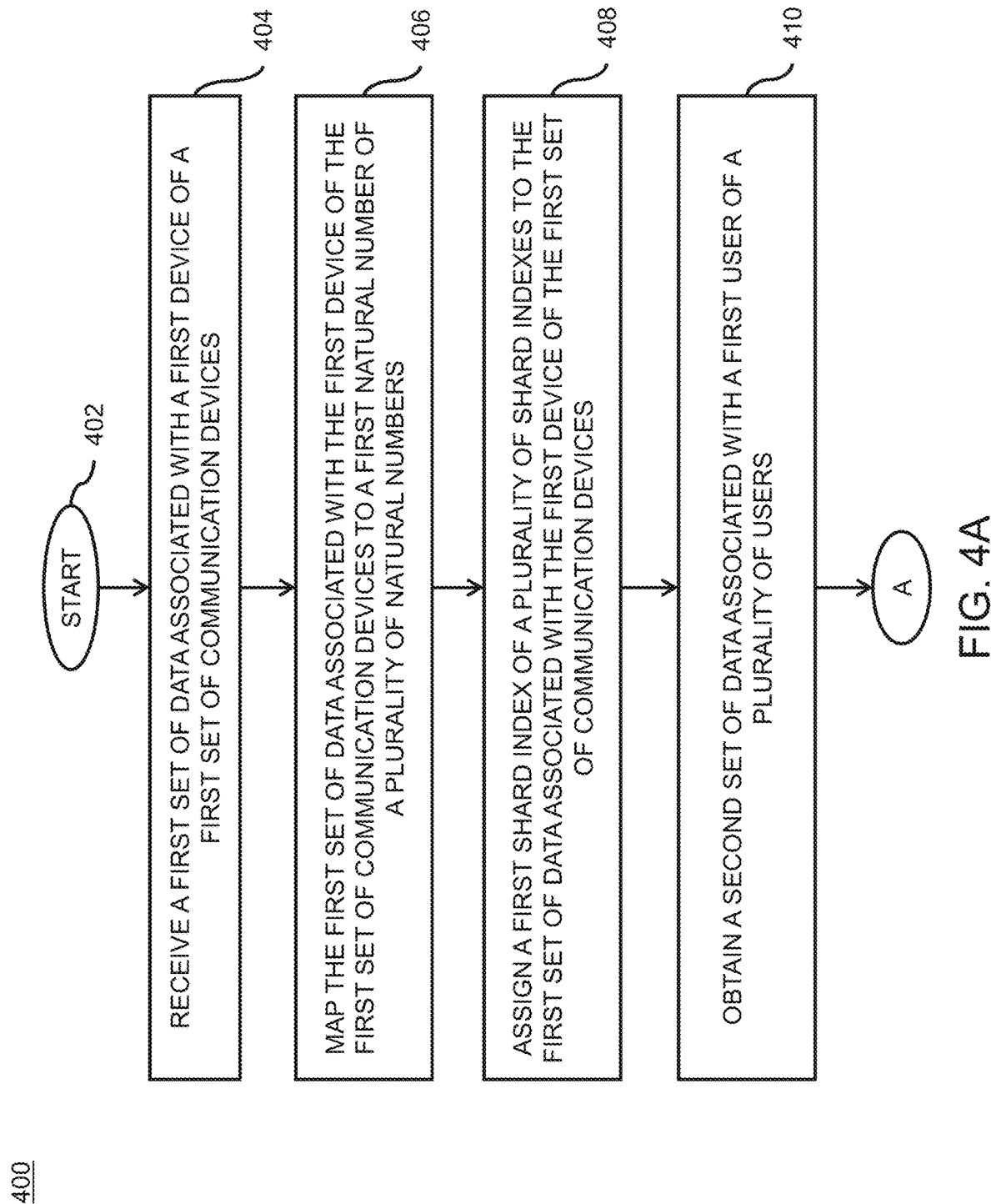
Figure 4B:
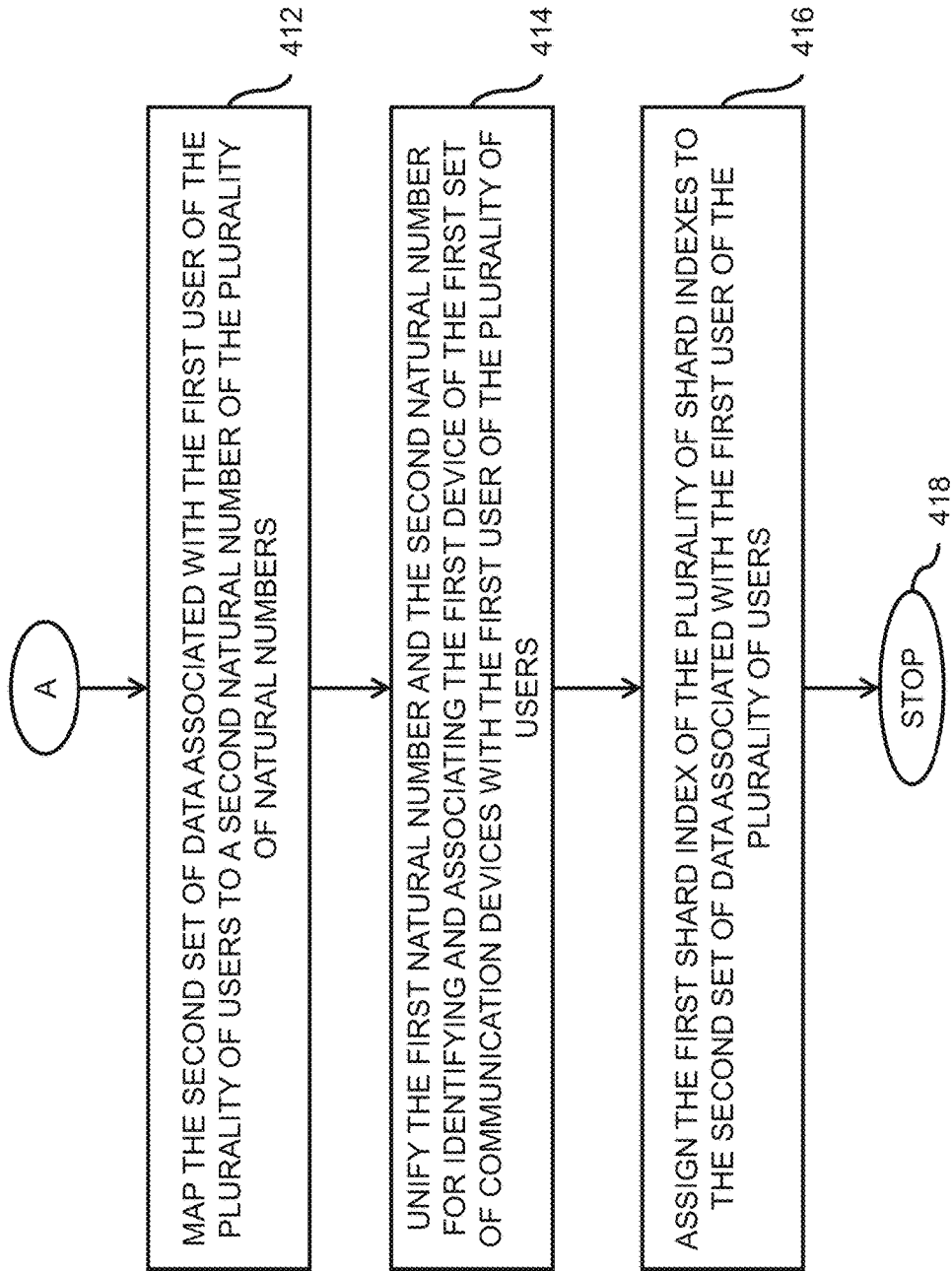
Figure 5:
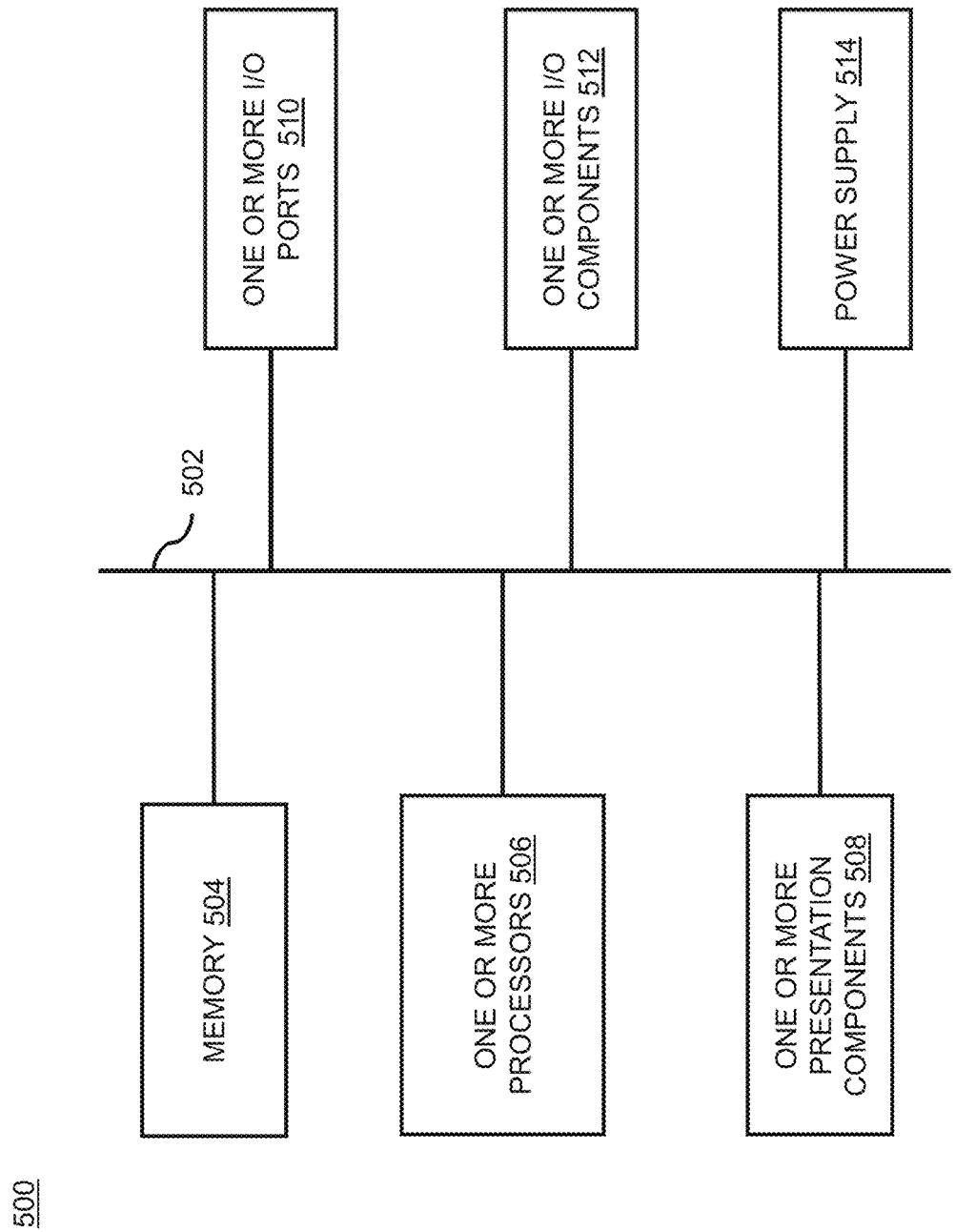

Having thus described the invention in general terms, reference will now be made to the accompanying drawings, which are not necessarily drawn to scale, and wherein:

FIG. 1 illustrates a general overview of a user unification system interacting with one or more online platforms in real-time, in accordance with various embodiments of the present disclosure;

FIG. 2 illustrates an interactive computing environment for performing unification of data of one or more users across a plurality of communication devices, in accordance with various embodiments of the present disclosure;

FIG. 3 illustrates a general overview of a non-volatile storage system, in accordance with various embodiments of the present disclosure;

FIGS. 4A and 4B illustrate a flow chart of the method for performing the unification of data of the one or more users across the plurality of communication devices, in accordance with various embodiments of the present disclosure; and FIG. 5 illustrates a block diagram of a computing device, in accordance with various embodiments of the present disclosure.

It should be noted that the accompanying figures are intended to present illustrations of exemplary embodiments of the present disclosure. These figures are not intended to limit the scope of the present disclosure. It should also be noted that accompanying figures are not necessarily drawn to scale.

DETAILED DESCRIPTION

In the following description, for purposes of explanation, numerous specific details are set forth in order to provide a thorough understanding of the present technology. It will be apparent, however, to one skilled in the art that the present technology can be practiced without these specific details. In other instances, structures and devices are shown in block diagram form only in order to avoid obscuring the present technology.

Reference in this specification to "one embodiment" or "an embodiment" means that a particular feature, structure, or characteristic described in connection with the embodiment is included in at least one embodiment of the present technology. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Reference will now be made in detail to selected embodiments of the present disclosure in conjunction with accompanying figures. The embodiments described herein are not intended to limit the scope of the disclosure, and the present disclosure should not be construed as limited to the embodiments described. This disclosure may be embodied in different forms without departing from the scope and spirit of the disclosure. It should be understood that the accompanying figures are intended and provided to illustrate embodiments of the disclosure described below and are not necessarily drawn to scale. In the drawings, like numbers refer to like elements throughout, and thicknesses and dimensions of some components may be exaggerated for providing better clarity and ease of understanding.

It should be noted that the terms "first", "second", and the like, herein do not denote any order, quantity, or importance, but rather are used to distinguish one element from another. Further, the terms "a" and "an" herein do not denote a limitation of quantity, but rather denote the presence of at least one of the referenced item.

FIG. 1 illustrates a general overview 100 of a user unification system 110 interacting with one or more online platforms 108 in real-time, in accordance with various embodiments of the present disclosure. FIG. 2 illustrates an interactive computing environment 200 for performing unification of data of one or more users 102 across a plurality of communication devices 104, in accordance with various embodiments of the present disclosure. In general, online platform is a computing platform that enables various individuals to obtain, upload and access valuable resources or services. The general overview 100 includes the one or more users 102, the plurality of communication devices 104, a communication network 106, the user unification system 110, and the one or more online platforms 108. In addition, the user unification system 110 associates an anonymous profile with an identified profile. Here, the anonymous profile refers to a profile of a user who has visited the online platform for the first time. Here, the identified profile refers to a profile of a user who has visited the online platform at least once before. Further, the user unification system 110 encounters the anonymous profile when the one or more users 102 visit the one or more online platforms 108 for a first time. Furthermore, the user unification system 110 performs database management for the one or more online platforms 108. Moreover, the user unification system 110 stores and manages data associated with the anonymous profile and the identified profile for the one or more online platforms 108.

The interactive computing environment 200 is any environment which facilitates interaction of the one or more users 102 with the one or more online platforms 108. In addition, the interactive computing environment 200 includes a first user 202a, a second user 202b, a third user 202c, a first set of communication devices 204a, and a second set of communication devices 204b. Further, the interactive computing environment 200 includes a third set of communication devices 204c, the one or more online platforms 108, the user unification system 110, a server 206, a non-volatile storage system 208, and a database 210.

The one or more users 102 are any persons or individuals who access the plurality of communication devices 104. In an embodiment of the present disclosure, each of the one or more users 102 is an owner of the plurality of communication devices 104. In another embodiment of the present disclosure, each of the one or more users 102 is not the owner of the plurality of communication devices 104. In an embodiment of the present disclosure, the one or more users 102 may access the plurality of communication devices 104 at home. In another embodiment of the present disclosure, the one or more users 102 may access the plurality of communication devices 104 at a cafe. In yet another embodiment of the present disclosure, the one or more users 102 may access the plurality of communication devices 104 in an office. In an example, a user U1 accesses a smartphone S1 while sitting in a living room. In another example, a user U2 accesses a laptop L1 while travelling from one place to another. In yet another example, a user U3 accesses a desktop computer D1 while working in the office.

The one or more users 102 correspond to any number of person or individual associated with the user unification system 110. In an embodiment of the present disclosure, the one or more users 102 include the first user 202a, the second user 202b, and the third user 202c. The user unification system 110 stores data of each of the one or more users 102 who accesses the one or more online platforms 108 through the plurality of communication devices 104 using the communication network 106. In an example, a user U1 visits a webpage W1 of an online platform P1 through a communication device D1 (let's say a smartphone). In another example, a user U2 signs up on a webpage W2 of an online platform P2 using a communication device D2 (let's say a desktop computer). In yet another example, a user U3 accesses content on a webpage W3 of an online platform P3 through a communication device D3 (let's say a laptop).

The one or more users 102 access the one or more online platforms 108 through the plurality of communication devices 104. The plurality of communication devices 104 is associated with the one or more users 102. The user unification system 110 receives data associated with the plurality of communication devices 104 and the one or more users 102. The data includes device identity data and personal identity information. In an embodiment of the present disclosure, the data is received from one or more online platform databases, plurality of communication devices databases, and third party databases. In another embodiment of the present disclosure, the data is received from the one or more users 102.

The one or more users 102 are connected with the interactive computing environment 200 through the plurality of communication devices 104. In an embodiment of the present disclosure, the plurality of communication devices 104 includes the first set of communication devices 204a, the second set of communication devices 204b and the third set of communication devices 204c. In addition, the first set of communication devices 204a, the second set of communication devices 204b and the third set of communication devices 204c facilitate access to the one or more online platforms 108. In an embodiment of the present disclosure, each of the plurality of communication devices 104 is a portable communication device. The portable communication device includes but may not be limited to a laptop, a smartphone, a tablet, and a smart watch. In an example, the smartphone is an iOS-based smartphone, an android-based smartphone, a windows-based smartphone and the like. In another embodiment of the present disclosure, each of the plurality of communication devices 104 is a fixed communication device. The fixed communication device includes but may not be limited to a desktop, a workstation, a smart TV and a mainframe computer. In an embodiment of the present disclosure, the plurality of communication devices 104 is currently in the switched-on state. The plurality of communication devices 104 is any type of devices that have ability to communicate with other devices using an active internet connection. In addition, each of the one or more users 102 accesses corresponding communication device of the plurality of communication devices 104 in real-time.

In an embodiment of the present disclosure, the plurality of communication devices 104 performs computing operations based on a suitable operating system installed inside the plurality of communication devices 104. In general, operating system is system software that manages computer hardware and software resources and provides common services for computer programs. In addition, the operating system acts as an interface for software installed inside the plurality of communication devices 104 to interact with hardware components of the plurality of communication devices 104. In an embodiment of the present disclosure, each of the plurality of communication devices 104 performs computing operations based on any suitable operating system designed for the portable communication device. In an example, the operating system installed inside the plurality of communication devices is a mobile operating system. Further, the mobile operating system includes but may not be limited to windows operating system, android operating system, iOS operating system, Symbian operating system, and Sailfish operating system. However, the operating system is not limited to above mentioned operating systems. In an embodiment of the present disclosure, the plurality of communication devices 104 operates on any version of particular operating system corresponding to above mentioned operating systems.

In another embodiment of the present disclosure, the plurality of communication devices 104 performs computing operations based on any suitable operating system designed for fixed communication device. In an example, the operating system installed inside the plurality of communication devices is Windows. In another example, the operating system installed inside the plurality of communication devices is Mac. In yet another example, the operating system installed inside the plurality of communication devices is Linux based operating system. In yet another example, the operating system installed inside the plurality of communication devices is Chrome OS. In yet another example, the operating system installed inside the plurality of communication devices is one of UNIX, Kali Linux, and the like. However, the operating system is not limited to above mentioned operating systems.

In an embodiment of the present disclosure, the plurality of communication devices 104 operates on any version of Windows operating system. In another embodiment of the present disclosure, the plurality of communication devices 104 operates on any version of Mac operating system. In yet another embodiment of the present disclosure, the plurality of communication devices 104 operates on any version of Linux operating system. In yet another embodiment of the present disclosure, the plurality of communication devices 104 operates on any version of Chrome OS. In yet another embodiment of the present disclosure, the plurality of communication devices 104 operates on any version of particular operating system corresponding to above mentioned operating systems.

The plurality of communication devices 104 is connected to the communication network 106. The communication network 106 provides a medium for the one or more users 102 accessing a plurality of contents on the one or more online platforms 108 to connect with the user unification system 110. In an embodiment of the present disclosure, the communication network 106 is an internet connection. In another embodiment of the present disclosure, the communication network 106 is a wireless mobile network. In yet another embodiment of the present disclosure, the communication network 106 is a wired network with a finite bandwidth. In yet another embodiment of the present disclosure, the communication network 106 is a combination of the wireless and the wired network for the optimum throughput of data transmission. In yet another embodiment of the present disclosure, the communication network 106 is an optical fiber high bandwidth network that enables a high data rate with negligible connection drops. The communication network 106 includes a set of channels. Each channel of the set of channels supports a finite bandwidth. In addition, the finite bandwidth of each channel of the set of channels is based on capacity of the communication network 106. The communication network 106 connects the plurality of communication devices 104 to the user unification system 110 using a plurality of methods. The plurality of methods used to provide network connectivity to the plurality of communication devices includes 2G, 3G, 4G, 5G, Wifi and the like.

The one or more online platforms 108 include the plurality of contents. In an embodiment of the present disclosure, the plurality of contents include but may not be limited to a plurality of OTT media contents, a plurality of products, a plurality of financial services, and one or more social media contents. In another embodiment of the present disclosure, the plurality of contents include but may not be limited to a plurality of health services, a plurality of educational services, a plurality of real estate services, and a plurality of travel services.

The one or more online platforms 108 include an over-the-top media platform 108A, an e-commerce platform 108B, a fintech platform 108C, a social media platform 108D, and a health platform 108E. In addition, the one or more online platforms 108 include an educational platform 108F, a real estate and housing platform 108G, and a travel platform 108H. However, the one or more online platforms 108 are not limited to the above-mentioned online platforms.

In an embodiment of the present disclosure, the one or more online platforms 108 correspond to android operating system compatible applications. In another embodiment of the present disclosure, the one or more online platforms 108 correspond to windows operating system compatible applications. In yet another embodiment of the present disclosure, the one or more online platforms 108 correspond to iPhone operating system compatible applications. In yet another embodiment of the present disclosure, the one or more online platforms 108 correspond to mac operating system compatible applications. In yet another embodiment of the present disclosure, the one or more online platforms 108 correspond to webpages. However, the one or more online platforms 108 are not limited to the above-mentioned online platforms.

In an embodiment of the present disclosure, the one or more online platforms 108 include the over-the-top media platform 108A. In general, over-the-top media platform provides a streaming media service to various individuals over internet. In addition, the over-the-top media platform 108A has the plurality of OTT media contents. The plurality of OTT media contents include but may not be limited to drama series, documentaries, anime, comedy series, science based series, kid series, movies, and stand-up comedy shows. The plurality of OTT media contents is searched using a plurality of genre codes on the over-the-top media platform 108A. The plurality of genre codes include but may not be limited to action and adventure, action comedies, action sci-fi and fantasy, action thrillers, anime action, region based action content, crime action, and classic action. In an example, an individual I opens an over-the-top media platform O1 on a web browser W1 to watch live baseball match on a communication device D1 (let's say a smartphone) using internet connection.

In an embodiment of the present disclosure, the one or more online platforms 108 include the e-commerce platform 108B. In general, e-commerce platform provides an online service of buying or selling of various products over the Internet. In addition, the e-commerce platform 108B has the plurality of products. The plurality of products include but may not be limited to laptops, tablets, mobiles, clocks, decorative accessories, books, home appliances, shoes, bags, jewelry, clothes, stationery, golf kit, and baseball bat. The plurality of products is searched using a plurality of sections on the e-commerce platform 108B. The plurality of sections include but may not be limited to books and audible, movies and games, electronics, toys, clothes, sports, health and beauty, business, industry, science, and handmade. In an example, an Individual I launches an e-commerce application E1 on a communication device D1 (let's say a desktop) to surf various shoes brands.

In an embodiment of the present disclosure, the one or more online platforms 108 include the fintech platform 108C. In general, fintech platform provides an online financial service to the various individuals over the Internet. In addition, the fintech platform 108C includes the plurality of financial services. The plurality of financial services include but may not be limited to car buying loans, house buying loans, credit cards, net banking, commercial banking, opening saving accounts, home equity, and stock exchange investment. However, the plurality of financial services is not limited to the above-mentioned financial services. In an example, an individual I searches for best education loan plan for higher studies on a fintech platform F1 using a communication device D1 (let's say a laptop).

In an embodiment of the present disclosure, the one or more online platforms 108 include the social media platform 108D. In general, social media platform facilitates creation and sharing of contents for various individuals over the internet. In addition, the social media platform 108D has the one or more social media contents. The one or more social media contents include but may not be limited to online games, business blogs, retail products, live video streams, text messages, multimedia contents, educational content, current affairs, and real-time activity updates. However, the one or more social media contents are not limited to the above-mentioned contents. In an example, an individual I promotes electronic product P1 on a social media platform S1 using a business page B1 on a communication device D1 (let's say a desktop).

In an embodiment of the present disclosure, the one or more online platforms 108 include the heath platform 108E. In general, health platform enables the various individuals to access personalized digital healthcare, diet and medicines to enhance efficiency of healthcare delivery. In addition, the health platform 108E provides the plurality of health services. The plurality of health services include but may not be limited to diet plans, medicines, physician clinics, nearest hospital, nearest fitness clubs, exercises, yoga classes, aerobics, healthy food orders, and medical tests. However, the plurality of health services is not limited to the above-mentioned services. In an example, a patient P1 searches for bronchial asthma medicine M1 on a fintech platform F1 through a communication device D1 (let's say a tablet).

In an embodiment of the present disclosure, the one or more online platforms 108 include the education platform 108F. In general, education platform enables students and parents to access personalized digital educational information, tools and resources to enhance efficiency of educational development. In addition, the education platform 108F provides the plurality of educational services. The plurality of educational services include but may not be limited to live teacher-student interaction, online subject wise informative media contents, entrance examination preparatory matters, and technical support for educational projects. However, the plurality of educational services is not limited to the above-mentioned services. In an example, a student S1 finds difficult to solve an integration problem I1. The student S1 searches for an online lecture on integration on an education platform E1 through a communication device D1 (let's say a smartphone).

In an embodiment of the present disclosure, the one or more online platforms 108 include the real estate and housing platform 108G. In general, real estate and housing platform enables the various individuals to access personalized digital real estate and housing information and minimizes efforts of the corresponding individual. In addition, the real estate and housing platform 108G provides the plurality of real estate services. The plurality of real estate services include but may not be limited to houses on rent, properties on sale, house cleaning, garbage disposal, home repair, maintenance, and interior designing. However, the plurality of real estate services is not limited to the above-mentioned services. In an example, an individual I searches for an apartment A1 in a city C1 on a real estate platform through a communication device D2 (let's say a laptop).

In an embodiment of the present disclosure, the one or more online platforms 108 include the travel platform 108H. In general, travel platform enables the various individuals to access personalized digital travel and hospitality information. In addition, the travel platform 108H provides the plurality of travel services. The plurality of travel services include but may not be limited to flight booking, train booking, taxi hiring, vacation deals, hotel booking, travel destination information, couch-surfing travel, and hot restaurant deals. However, the plurality of travel services is not limited to the above-mentioned services. In an example, an individual I wants to book a hotel room R1 in city C2. The individual I surfs on a travel platform T1 through a communication device D1 (let's say a workstation).

In an embodiment of the present disclosure, the one or more online platforms 108 are installed on the plurality of communication devices 104. The one or more online platforms 108 allow the one or more users 102 to access the plurality of contents. In another embodiment of the present disclosure, the one or more online platforms 108 are run on a plurality of web browsers installed on the plurality of communication devices 104. In an example, the plurality of web browsers include but may not be limited to Opera, Mozilla Firefox, Google Chrome, Internet Explorer, Microsoft Edge, Safari and UC Browser. Further, the plurality of web browsers installed on the plurality of communication devices 104 runs on any version of the respective web browser of the above mentioned web browsers. In an example, a user U1 installs an e-commerce application E1 using a communication device D1 for first time. In another example, a user U2 fills up details to access a fintech webpage F2 on Google Chrome using a communication device D2 for first time.

In an embodiment of the present disclosure, the one or more users 102 install an application associated with the over-the-top media platform 108A on the plurality of communication devices 104. In another embodiment of the present disclosure, the one or more users 102 install an application associated with the e-commerce platform 108B on the plurality of communication devices 104. In yet another embodiment of the present disclosure, the one or more users 102 install an application associated with the fintech platform 108C on the plurality of communication devices 104. In yet another embodiment of the present disclosure, the one or more users 102 install an application associated with the social media platform 108D on the plurality of communication devices 104. In yet another embodiment of the present disclosure, the one or more users 102 install an application associated with the health platform 108E on the plurality of communication devices 104. In yet another embodiment of the present disclosure, the one or more users 102 install an application associated with the education platform 108F on the plurality of communication devices 104. In yet another embodiment of the present disclosure, the one or more users 102 install an application associated with the real-estate and housing platform 108G on the plurality of communication devices 104. In yet another embodiment of the present disclosure, the one or more users 102 install an application associated with the travel platform 108H on the plurality of communication devices 104.

In an embodiment of the present disclosure, the one or more users 102 access the over-the-top media platform 108A on the plurality of communication devices 104 through the plurality of web browsers. In another embodiment of the present disclosure, the one or more users 102 access the e-commerce platform 108B on the plurality of communication devices 104 through the plurality of web browsers. In yet another embodiment of the present disclosure, the one or more users 102 access the fintech platform 108C on the plurality of communication devices 104 through the plurality of web browsers. In yet another embodiment of the present disclosure, the one or more users 102 access the social media platform 108D on the plurality of communication devices 104 through the plurality of web browsers. In yet another embodiment of the present disclosure, the one or more users 102 access the health platform 108E on the plurality of communication devices 104 through the plurality of web browsers. In yet another embodiment of the present disclosure, the one or more users 102 access the education platform 108F on the plurality of communication devices 104 through the plurality of web browsers. In yet another embodiment of the present disclosure, the one or more users 102 access the real-estate and housing platform 108G on the plurality of communication devices 104 through the plurality of web browsers. In yet another embodiment of the present disclosure, the one or more users 102 access the travel platform 108H on the plurality of communication devices 104 through the plurality of web browsers. In general, web browsers are any software application that allows access of information on the World Wide Web. In an example, the plurality of web browsers includes but may not be limited to Opera, Mozilla Firefox, Google Chrome, Internet Explorer, Microsoft Edge, Safari and UC Browser.

The interactive computing environment 200 includes the one or more online platforms 108. The one or more users 102 perform various activities on the one or more online platforms 108 through the plurality of communication devices 104. In addition, the one or more users 102 access the plurality of contents on the one or more online platforms 108 in real-time. In an example, a user U1 watches comedy show C1 on online platform P1 through a communication device D1 (let's say a smartphone). In another example, a user U2 explores smart watches on the online platform P2 through the communication device D2 (let's say a desktop computer) in real-time. In yet another example, a user U3 reads fiction novel N1 on online platform P3 through a communication device D3 (let's say a laptop) in real-time. In yet another example, a user U4 clicks on notification N2 while watching adventure movie M1 on online platform P4 through a communication device D4 (let's say a tablet) in real-time. Further, the one or more online platforms 108 include the over-the top media platform 108A, the e-commerce platform 108B, the fintech platform 108C, the social media platform 108D, and the health platform 108E. Furthermore, the one or more online platforms 108 include the educational platform 108F, the real estate and housing platform 108G, and the travel platform 108H. However, the one or more online platforms 108 are not limited to the above-mentioned online platforms.

The user unification system 110 is associated with the one or more online platforms 108 and the one or more users 102. The one or more users 102 access the plurality of online platforms 108. In addition, the user unification system 110 enables unification of the one or more users 102 across the plurality of communication devices 104 based on the anonymous profile and the identified profile. Further, the user unification system 110 associates the first set of communication devices 204a to the first user 202a. Furthermore, the user unification system 110 associates the second set of communication devices 204b to the second user 202b. Moreover, the user unification system 110 associates the third set of communication devices 204c to the third user 202c. Also, the user unification system 110 stores data associated with the first user 202a and the first set of communication devices 204a in same shard. Also, the user unification system 110 stores data associated with the second user 202b and the second set of communication devices 204b in same shard. Also, the user unification system 110 stores data associated with the third user 202c and the third set of communication devices 204c in same shard. However, there may be more number of users associated with more number of communication devices.

The user unification system 110 receives a first set of data associated with a first device of the first set of communication devices 204a. In an embodiment of the present disclosure, the first device of the first set of communication devices 204a is anonymous for the one or more online platforms 108. Here, anonymous refers to a device though a user has accessed a particular online platform for a first time. The device is anonymous in terms of device ID or any other identification parameter. In addition, the first set of communication devices 204a is associated with the first user 202a of the one or more users 102. Further, the first set of data corresponds to device identity of the first device of the first set of communication devices 204a. In an embodiment of the present disclosure, the first set of data includes mobile equipment identifier (ME ID), international mobile equipment identity (IMEI), electronic serial number (ESN), and the like. In another embodiment of the present disclosure, the first set of data includes international mobile subscriber identity (IMSI), media access control address (MAC address), internet protocol address, and the like. In an example, a user U1 uses a device D1 (let's say a Smartphone) from a set of devices S1 to visit an online platform P1 (let's say an OTT platform). In addition, the online platform P1 receives mobile equipment identifier of the device D1 of the set of devices S1. Further, the online platform P1 stores mobile equipment identifier of the device D1. In another example, a user U2 uses a device D2 (let's say a laptop) from a set of devices S2 to visit an online platform P2 (let's say an e-commerce platform). In addition, the online platform P2 receives internet protocol address of the device D2 of the set of devices S2.

The user unification system 110 maps the first set of data associated with the first device of the first set of communication devices 204a to a first natural number of a plurality of natural numbers. In addition, the first natural number of the plurality of natural numbers is mapped for the first device of the first set of communication devices 204a using an increment sequence method. In general, natural numbers are positive integers such as 1, 2, 3, 4, 5, and the like. In an embodiment of the present disclosure, the increment sequence method enables generation of a natural number of the plurality of natural numbers for data for each device in an incremented way in a number sequence. In general, number sequence is list of numbers that are associated by a rule. In an embodiment of the present disclosure, the number sequence includes the plurality of natural numbers associated by a rule. In addition, the rule for the number sequence is to add 1 for every new communication device of the plurality of communication devices 104. Further, the increment sequence method enables the user unification system 110 to automatically map the first set of data in real-time. In an example, a user U1 uses a device D1 (let's say a Smartphone) from a set of devices S1 to visit an online platform P1 (let's say an OTT platform). In addition, the online platform P1 receives mobile equipment identifier of the device D1 of the set of devices S1. Further, the online platform P1 maps the mobile equipment identifier of the device D1 to 655. Furthermore, the user U1 uses a device D2 (let's say a tablet) from the set of devices S1 to visit the online platform P1. Moreover, the online platform P1 maps electronic serial number of the device D2 to 656 using incremented sequence. In another example, a user U2 uses a device D3 (let's say a laptop) from a set of devices S2 to visit an online platform P2 (let's say an e-commerce platform). In addition, the online platform P2 receives internet protocol address of the device D3 of the set of devices S2. Further, the online platform P2 maps the internet protocol address of the device D3 of the set of devices S2 to 702. Furthermore, the user U2 uses a device D4 (let's say a tablet) from the set of devices S2 to visit the online platform P2. Moreover, the online platform P2 maps electronic serial number of the device D4 to 703 using incremented sequence.

The user unification system 110 assigns a first shard index of a plurality of shard indexes to the first set of data associated with the first device of the first set of communication devices 204a. In addition, the first shard index of the plurality of shard indexes facilitates storage of the first set of data in corresponding shard of a plurality of shards 302 (as shown in FIG. 3) based on shard indexing process. Further, the shard indexing process enables the user unification system 110 to store the first set of data associated with the first device of the first set of communication devices 204a based on assigned first shard index. Furthermore, the shard indexing process allows allocation of the first shard index to the first set of data. Moreover, the shard indexing process provides indexing settings to control allocation of the plurality of shards 302 to the first set of data. In general, sharding is horizontal database partitioning method that separates large databases into smaller databases. In an embodiment of the present disclosure, the shard indexing process uses modulo operation to allocate the plurality of shards 302 to the first set of data. In an example, data associated with a device D1 (let's say a Smartphone) is mapped to 71. In addition, number of shards is 20. Further, data associated with the device D1 is stored in shard number 11 using mathematical formulation 71 modulo 20. In another example, data associated with a device D2 (let's say a Desktop) is mapped to 151. In addition, number of shards is 37. Further, data associated with the device D2 is stored in shard number 3 using mathematical formulation 151 modulo 37.

The user unification system 110 obtains a second set of data associated with the first user 202a of the one or more users 102. In addition, the first user 202a of the one or more users 102 accesses the one or more online platforms 108 using the first set of communication devices 204a. Further, the second set of data corresponds to personal identity of the first user 202a of the one or more users 102. In an embodiment of the present disclosure, the second set of data includes name data, age data, electronic mail identity data, folio number data, policy identity data, unique user identity data, contact number data, gender data, geographical location data, demographical data, and the like. In an example, a user U1 uses a device D1 (let's say a Smartphone) from a set of devices S1 to sign up on an online platform P1 (let's say an OTT platform). In addition, the online platform P1 receives name data of the user U1. Further, the online platform P1 stores name data of the user U1. In another example, a user U2 uses a device D2 (let's say a laptop) from a set of devices S2 to sign up on an online platform P2 (let's say an e-commerce platform). In addition, the online platform P2 receives e-mail identity of the user U2.

The user unification system 110 maps the second set of data associated with the first user 202a of the one or more users 102 to a second natural number of the plurality of natural numbers. In addition, the second natural number of the plurality of natural numbers is mapped for the first user 202a of the one or more users 102 using the increment sequence method. Further, the rule for the number sequence is to add 1 for every new user of the one or more users 102. Furthermore, the increment sequence method enables the user unification system 110 to automatically map the second set of data in real-time. In an example, a user U1 uses a device D1 (let's say a Smartphone) from a set of devices S1 to sign up on an online platform P1 (let's say an OTT platform). In addition, the online platform P1 receives name of the user U1. Further, the online platform P1 maps the name of the user U1 to 215. Furthermore, the user U1 uses a device D2 (let's say a tablet) from the set of devices S1 to sign up on the online platform P1. Moreover, the online platform P1 maps contact number of the device D2 to 216 using incremented sequence.

The user unification system 110 unifies the first natural number and the second natural number to identify and associate the first device of the first set of communication devices 204a with the first user 202a of the one or more users 102. In an example, a user U1 uses a device D1 (let's say a Smartphone) from a set of devices S1 to visit an online platform P1 (let's say an OTT platform). In addition, the online platform P1 receives mobile equipment identifier of the device D1 of the set of devices S1. Further, the online platform P1 maps the mobile equipment identifier of the device D1 to 655. Furthermore, the user U1 uses the device D1 from the set of devices S1 to sign up on the online platform P1. Moreover, the online platform P1 mapped name of the user U1 to 655 using unification.

The user unification system 110 assigns the first shard index of the plurality of shard indexes to the second set of data associated with the first user 202a of the one or more users 102. In addition, the first shard index of the plurality of shard indexes facilitates storing of the second set of data in corresponding shard of the plurality of shards 302 based on the shard indexing process. Further, the shard indexing process enables the user unification system 110 to store the first set of data and the second set of data associated with the first user 202a of the one or more users 102 in same shard of the plurality of shards 302.

The user unification system 110 fetches a third set of data associated with at least one other communication device of the first set of communication devices 204a. In addition, the third set of data corresponds to device identity of the at least one other communication device of the first set of communication devices 204a. Further, the user unification system 110 maps the third set of data associated with the at least one other communication device of the first set of communication devices 204a to a third natural number of the plurality of natural numbers. Furthermore, the third natural number of the plurality of natural numbers is mapped for the at least one other communication device of the first set of communication devices 204a using the increment sequence method. Moreover, the user unification system 110 unifies the third natural number with the first natural number and the second natural number to identify and associate the at least one other communication device of the first set of communication devices 204a with the first user of the one or more users 102. Also, the user unification system 110 assigns the first shard index of the plurality of shard indexes to the third set of data associated with the at least one other communication device of the first set of communication devices 204a. Also, the first shard index of the plurality of shard indexes facilitates storing of the third set of data in corresponding shard of the plurality of shards 302 based on shard indexing process.

The interactive computing environment 200 includes the first set of communication devices 204a, the second set of communication devices 204b and the third set of communication devices 204c. The first set of communication devices 204a provide an interface for the first user 202a of the one or more users 102 to interact with the one or more online platforms 108. In addition, the second set of communication devices 204b provide an interface for the second user 202b of the one or more users 102 to interact with the one or more online platforms 108. Further, the third set of communication devices 204c provide an interface for the third user 202c of the one or more users 102 to interact with the one or more online platforms 108. In an example, a user U1 connects with an online platform O1 through a set of communication devices S1 (let's say a smartphone, a tablet and a desktop). In another example, a user U2 connects with an online platform O2 through a set of communication devices S2 (let's say a laptop, a tablet and a workstation).

In an embodiment of the present disclosure, the first user 202a visits the over-the-top media platform 108a using any of the first set of communication devices 204a for first time. In another embodiment of the present disclosure, the first user 202a visits the e-commerce platform 108b using any of the first set of communication devices 204a for first time. In yet another embodiment of the present disclosure, the first user 202a visits the fintech platform 108c using any of the first set of communication devices 204a for first time. In yet another embodiment of the present disclosure, the first user 202a visits the social media platform 108d using any of the first set of communication devices 204a for first time. In yet another embodiment of the present disclosure, the first user 202a visits the health platform 108e using any of the first set of communication devices 204a for first time. In yet another embodiment of the present disclosure, the first user 202a visits the education platform 108f using any of the first set of communication devices 204a for first time. In yet another embodiment of the present disclosure, the first user 202a visits the real estate and housing platform 108g using any of the first set of communication devices 204a for first time. In yet another embodiment of the present disclosure, the first user 202a visits the travel platform 108h using any of the first set of communication devices 204a for first time.

In an embodiment of the present disclosure, the second user 202b visits the over-the-top media platform 108a using any of the second set of communication devices 204b for first time. In another embodiment of the present disclosure, the second user 202b visits the e-commerce platform 108b using any of the second set of communication devices 204b for first time. In yet another embodiment of the present disclosure, the second user 202b visits the fintech platform 108c using any of the second set of communication devices 204b for first time. In yet another embodiment of the present disclosure, the second user 202b visits the social media platform 108d using any of the second set of communication devices 204b for first time. In yet another embodiment of the present disclosure, the second user 202b visits the health platform 108e using any of the second set of communication devices 204b for first time. In yet another embodiment of the present disclosure, the second user 202b visits the education platform 108f using any of the second set of communication devices 204b for first time. In yet another embodiment of the present disclosure, the second user 202b visits the real estate and housing platform 108g using any of the second set of communication devices 204b for first time. In yet another embodiment of the present disclosure, the second user 202b visits the travel platform 108h using any of the second set of communication devices 204b for first time.

In an embodiment of the present disclosure, the third user 202c visits the over-the-top media platform 108a using any of the third set of communication devices 204c for first time. In another embodiment of the present disclosure, the third user 202c visits the e-commerce platform 108b using any of the third set of communication devices 204c for first time. In yet another embodiment of the present disclosure, the third user 202c visits the fintech platform 108c using any of the third set of communication devices 204c for first time. In yet another embodiment of the present disclosure, the third user 202c visits the social media platform 108d using any of the third set of communication devices 204c for first time. In yet another embodiment of the present disclosure, the third user 202c visits the health platform 108e using any of the third set of communication devices 204c for first time. In yet another embodiment of the present disclosure, the third user 202c visits the education platform 108f using any of the third set of communication devices 204c for first time. In yet another embodiment of the present disclosure, the third user 202c visits the real estate and housing platform 108g using any of the third set of communication devices 204c for first time. In yet another embodiment of the present disclosure, the third user 202c visits the travel platform 108h using any of the third set of communication devices 204c for first time.

In an embodiment of the present disclosure, the over-the-top media platform 108a treats the first user 202a of any of the first set of communication devices 204a as the anonymous profile for first visit. In another embodiment of the present disclosure, the e-commerce platform 108b treats the first user 202a of any of the first set of communication devices 204a as the anonymous profile for first visit. In yet another embodiment of the present disclosure, the fintech platform 108c treats the first user 202a of any of the first set of communication devices 204a as the anonymous profile for first visit. In yet another embodiment of the present disclosure, the social media platform 108d treats the first user 202a of any of the first set of communication devices 204a as the anonymous profile for first visit. In yet another embodiment of the present disclosure, the health platform 108e treats the first user 202a of any of the first set of communication devices 204a as the anonymous profile for first visit. In yet another embodiment of the present disclosure, the education platform 108f treats the first user 202a of any of the first set of communication devices 204a as the anonymous profile for first visit. In yet another embodiment of the present disclosure, the real estate and housing platform 108g treats the first user 202a of any of the first set of communication devices 204a as the anonymous profile for first visit. In yet another embodiment of the present disclosure, the travel platform 108h treats the first user 202a of any of the first set of communication devices 204a as the anonymous profile for first visit.

In an embodiment of the present disclosure, the over-the-top media platform 108a treats the second user 202b of any of the second set of communication devices 204b as the anonymous profile for first visit. In another embodiment of the present disclosure, the e-commerce platform 108b treats the second user 202b of any of the second set of communication devices 204b as the anonymous profile for first visit. In yet another embodiment of the present disclosure, the fintech platform 108c treats the second user 202b of any of the second set of communication devices 204b as the anonymous profile for first visit. In yet another embodiment of the present disclosure, the social media platform 108d treats the second user 202b of any of the second set of communication devices 204b as the anonymous profile for first visit. In yet another embodiment of the present disclosure, the health platform 108e treats the second user 202b of any of the second set of communication devices 204b as the anonymous profile for first visit. In yet another embodiment of the present disclosure, the education platform 108f treats the second user 202b of any of the second set of communication devices 204b as the anonymous profile for first visit. In yet another embodiment of the present disclosure, the real estate and housing platform 108g treats the second user 202b of any of the second set of communication devices 204b as the anonymous profile for first visit. In yet another embodiment of the present disclosure, the travel platform 108h treats the second user 202b of any of the second set of communication devices 204b as the anonymous profile for first visit.

In an embodiment of the present disclosure, the over-the-top media platform 108a treats the third user 202c of any of the third set of communication devices 204c as the anonymous profile for first visit. In another embodiment of the present disclosure, the e-commerce platform 108b treats the third user 202c of any of the third set of communication devices 204c as the anonymous profile for first visit. In yet another embodiment of the present disclosure, the fintech platform 108c treats the third user 202c of any of the third set of communication devices 204c as the anonymous profile for first visit. In yet another embodiment of the present disclosure, the social media platform 108d treats the third user 202c of any of the third set of communication devices 204c as the anonymous profile for first visit. In yet another embodiment of the present disclosure, the health platform 108e treats the third user 202c of any of the third set of communication devices 204c as the anonymous profile for first visit. In yet another embodiment of the present disclosure, the education platform 108f treats the third user 202c of any of the third set of communication devices 204c as the anonymous profile for first visit. In yet another embodiment of the present disclosure, the real estate and housing platform 108g treats the third user 202c of any of the third set of communication devices 204c as the anonymous profile for first visit. In yet another embodiment of the present disclosure, the travel platform 108h treats the third user 202c of any of the third set of communication devices 204c as the anonymous profile for first visit.

In an embodiment of the present disclosure, the first user 202a creates an account on the over-the-top media platform 108a using any of the first set of communication devices 204a. In another embodiment of the present disclosure, the first user 202a creates the account on the e-commerce platform 108b using any of the first set of communication devices 204a. In yet another embodiment of the present disclosure, the first user 202a creates the account on the fintech platform 108c using any of the first set of communication devices 204a. In yet another embodiment of the present disclosure, the first user 202a creates the account on the social media platform 108d using any of the first set of communication devices 204a. In yet another embodiment of the present disclosure, the first user 202a creates the account on the health platform 108e using any of the first set of communication devices 204a. In yet another embodiment of the present disclosure, the first user 202a creates the account on the education platform 108f using any of the first set of communication devices 204a. In yet another embodiment of the present disclosure, the first user 202a creates the account on the real estate and housing platform 108g using any of the first set of communication devices 204a. In yet another embodiment of the present disclosure, the first user 202a creates the account on the travel platform 108h using any of the first set of communication devices 204a.

In an embodiment of the present disclosure, the second user 202b creates the account on the over-the-top media platform 108a using any of the second set of communication devices 204b. In another embodiment of the present disclosure, the second user 202b creates the account on the e-commerce platform 108b using any of the second set of communication devices 204b. In yet another embodiment of the present disclosure, the second user 202b creates the account on the fintech platform 108c using any of the second set of communication devices 204b. In yet another embodiment of the present disclosure, the second user 202b creates the account on the social media platform 108d using any of the second set of communication devices 204b. In yet another embodiment of the present disclosure, the second user 202b creates the account on the health platform 108e using any of the second set of communication devices 204b. In yet another embodiment of the present disclosure, the second user 202b creates the account on the education platform 108f using any of the second set of communication devices 204b. In yet another embodiment of the present disclosure, the second user 202b creates the account on the real estate and housing platform 108g using any of the second set of communication devices 204b. In yet another embodiment of the present disclosure, the second user 202b creates the account on the travel platform 108h using any of the second set of communication devices 204b.

In an embodiment of the present disclosure, the third user 202c creates the account on the over-the-top media platform 108a using any of the third set of communication devices 204c. In another embodiment of the present disclosure, the third user 202c creates the account on the e-commerce platform 108b using any of the third set of communication devices 204c. In yet another embodiment of the present disclosure, the third user 202c creates the account on the fintech platform 108c using any of the third set of communication devices 204c. In yet another embodiment of the present disclosure, the third user 202c creates the account on the social media platform 108d using any of the third set of communication devices 204c. In yet another embodiment of the present disclosure, the third user 202c creates the account on the health platform 108e using any of the third set of communication devices 204c. In yet another embodiment of the present disclosure, the third user 202c creates the account on the education platform 108f using any of the third set of communication devices 204c. In yet another embodiment of the present disclosure, the third user 202c creates the account on the real estate and housing platform 108g using any of the third set of communication devices 204c. In yet another embodiment of the present disclosure, the third user 202c creates the account on the travel platform 108h using any of the third set of communication devices 204c.

In an embodiment of the present disclosure, the over-the-top media platform 108a treats a profile of the first user 202a associated with any of the first set of communication devices 204a as the identified profile when the account is created. In another embodiment of the present disclosure, the e-commerce platform 108b treats a profile of the first user 202a associated with any of the first set of communication devices 204a as the identified profile when the account is created. In yet another embodiment of the present disclosure, the fintech platform 108c treats a profile of the first user 202a associated with any of the first set of communication devices 204a as the identified profile when the account is created. In yet another embodiment of the present disclosure, the social media platform 108d treats a profile of the first user 202a associated with any of the first set of communication devices 204a as the identified profile when the account is created. In yet another embodiment of the present disclosure, the health platform 108e treats a profile of the first user 202a associated with any of the first set of communication devices 204a as the identified profile when the account is created. In yet another embodiment of the present disclosure, the education platform 108f treats a profile of the first user 202a associated with any of the first set of communication devices 204a as the identified profile when the account is created. In yet another embodiment of the present disclosure, the real estate and housing platform 108g treats a profile of the first user 202a associated with any of the first set of communication devices 204a as the identified profile when the account is created. In yet another embodiment of the present disclosure, the travel platform 108h treats a profile of the first user 202a associated with any of the first set of communication devices 204a as the identified profile when the account is created.

In an embodiment of the present disclosure, the over-the-top media platform 108a treats a profile of the second user 202b associated with any of the second set of communication devices 204b as the identified profile when the account is created. In another embodiment of the present disclosure, the e-commerce platform 108b treats a profile of the second user 202b associated with any of the second set of communication devices 204b as the identified profile when the account is created. In yet another embodiment of the present disclosure, the fintech platform 108c treats a profile of the second user 202b associated with any of the second set of communication devices 204b as the identified profile when the account is created. In yet another embodiment of the present disclosure, the social media platform 108d treats a profile of the second user 202b associated with any of the second set of communication devices 204b as the identified profile when the account is created. In yet another embodiment of the present disclosure, the health platform 108e treats a profile of the second user 202b associated with any of the second set of communication devices 204b as the identified profile when the account is created. In yet another embodiment of the present disclosure, the education platform 108f treats a profile of the second user 202b associated with any of the second set of communication devices 204b as the identified profile when the account is created. In yet another embodiment of the present disclosure, the real estate and housing platform 108g treats a profile of the second user 202b associated with any of the second set of communication devices 204b as the identified profile when the account is created. In yet another embodiment of the present disclosure, the travel platform 108h treats a profile of the second user 202b associated with any of the second set of communication devices 204b as the identified profile when the account is created.

In an embodiment of the present disclosure, the over-the-top media platform 108a treats a profile of the third user 202c associated with any of the third set of communication devices 204c as the identified profile when the account is created. In another embodiment of the present disclosure, the e-commerce platform 108b treats a profile of the third user 202c associated with any of the third set of communication devices 204c as the identified profile when the account is created. In yet another embodiment of the present disclosure, the fintech platform 108c treats a profile of the third user 202c associated with any of the third set of communication devices 204c as the identified profile when the account is created. In yet another embodiment of the present disclosure, the social media platform 108d treats a profile of the third user 202c associated with any of the third set of communication devices 204c as the identified profile when the account is created. In yet another embodiment of the present disclosure, the health platform 108e treats a profile of the third user 202c associated with any of the third set of communication devices 204c as the identified profile when the account is created. In yet another embodiment of the present disclosure, the education platform 108f treats a profile of the third user 202c associated with any of the third set of communication devices 204c as the identified profile when the account is created. In yet another embodiment of the present disclosure, the real estate and housing platform 108g treats a profile of the third user 202c associated with any of the third set of communication devices 204c as the identified profile when the account is created. In yet another embodiment of the present disclosure, the travel platform 108h treats a profile of the third user 202c associated with any of the third set of communication devices 204c as the identified profile when the account is created.

The interactive computing environment 200 includes the server 206, the non-volatile storage system 208, and the database 210. The user unification system 110 is associated with the server 206. In general, server is a computer program or device that provides functionality for other programs or devices. The server 206 provides various functionalities, such as sharing data or resources among multiple clients, or performing computation for a client. However, those skilled in the art would appreciate that the user unification system 110 is connected to more number of servers. Furthermore, it may be noted that the server 206 includes a random access memory connected to the non-volatile storage system 208. In an embodiment of the present disclosure, the random access memory is connected to the non-volatile storage system 208 through a bus. In addition, the random access memory allows the server 206 to store data associated with the plurality of communication devices 104 and the one or more users 102 in the non-volatile storage system 208 using the bus. Further, the server 206 includes the database 210. However, those skilled in the art would appreciate that more number of the servers include more numbers of the databases.

In an embodiment of the present disclosure, the user unification system 110 is hosted on the server 206. In another embodiment of the present disclosure, the user unification system 110 is connected with the server 206. In yet another embodiment of the present disclosure, the user unification system 110 is part of the server 206. The server 206 handles each operation and task performed by the user unification system 110. The server 206 stores one or more instructions for performing the various operations of the user unification system 110. The server 206 is located remotely from the user unification system 110. The server 206 is associated with an administrator. In general, administrator manages the different components of system. The administrator coordinates activities of the components involved in the user unification system 110. The administrator is any person or individual who monitors working of the user unification system 110 and the server 206 in real-time. The administrator monitors working of the user unification system 110 and the server 206 through a communication device. The communication device includes the laptop, the desktop computer, the tablet, a personal digital assistant and the like.

The database 210 stores different sets of information associated with various components of the user unification system 110. In general, database is used to store general information and specialized data, such as characteristics data of the one or more users 102, data of the plurality of communication devices 104, data of the one or more online platforms 108 and the like. The database 210 stores information of the one or more online platforms 108, the plurality of communication devices 104, the anonymous profile of the one or more users 102, the identified profile of the one or more users 102, demographic information of the one or more users 102 and the like. The database 210 organizes the data using model such as relational models or hierarchical models. Further, the database 210 stores data provided by the administrator.

FIG. 3 illustrates a general overview 300 of the non-volatile storage system 208 (as shown in FIG. 2), in accordance with various embodiments of the present disclosure. In addition, the general overview 300 includes the non-volatile storage system 208. Further, the non-volatile storage system 208 includes the plurality of shards 302. Furthermore, the random access memory is connected to the non-volatile storage system 208. In an embodiment of the present disclosure, the random access memory is connected to the non-volatile storage system 208 through a bus. In general, Random-access memory is a temporary computer memory that can be read and changed in any order. In addition, random-access memory allows data items to be read or written in almost same amount of time irrespective of physical location of data inside memory. Further, random-access memory contains multiplexing and de-multiplexing circuitry. The non-volatile storage system 208 includes the plurality of shards 302 to store data associated with the plurality of communication devices 104 and the one or more users 102. In an embodiment of the present disclosure, the non-volatile storage system 208 is a hard disk. In another embodiment of the present disclosure, the non-volatile storage system 208 is a solid state drive (SSD). In an embodiment of the present disclosure, the non-volatile storage system 208 stores data associated with the plurality of communication devices 104 and the one or more users 102 permanently.

In an embodiment of the present disclosure, number of the plurality of shards 302 is 8. In another embodiment of the present disclosure, number of the plurality of shards 302 may vary. In addition, the plurality of shards 302 includes a shard 302a-302h. Further, the first set of data associated with the first device of the first set of communication devices 204a and the second set of data associated with the first user 202a are stored in the shard 302a. Furthermore, data associated with the second set of communication devices 204b and the second user 202b are stored in the shard 302b. Moreover, data associated with the third set of communication devices 204c and the third user 202c are stored in the shard 302c.

In an example, a system S1 receives device identity of a device D1 (Let's say a workstation) when the device D1 visits an online platform O1 (Let's say a Travel platform) for the first time. In addition, the system S1 maps device identity of the device D1 to a natural number N1. Further, the system S1 assigns a shard 1 to store device identity of the device D1 based on the natural number N1 using shard indexing process. Furthermore, the system S1 receives user identity of a user U1 who uses the device D1 to access to access the online platform O1. Moreover, the system S1 maps user identity of the user U1 to a natural number N2. Also, the system S1 unifies the natural number N1 and the natural number N2. Also, the system S1 assigns same shard 1 to store user identity of the user U1 using shard indexing process. Also, the user U1 uses a device D2 (Let's say a Laptop) to access the online platform O1. Also, the shard S1 stores device identity associated with the device D2. Also, the user U1 uses a device D3 (Let's say a smartphone) to access the online platform O1. Also, the shard S1 stores device identity associated with the device D3. Also, data associated with the device D1, the device D2, the device D3, and the user U1 stays in the shard S1. Also, the system S1 receives device identity of a device D4 (Let's say a tablet) that is anonymous. Also, the system S1 stores device identity of the device D4 in a shard 2 instead of the shard 1.

FIGS. 4A and 4B illustrate a flow chart 400 of the method for performing unification of data of the one or more users 102 across the plurality of communication devices 104, in accordance with various embodiments of the present disclosure. It may be noted that in order to explain the method steps of the flowchart 400, references will be made to the elements explained in FIG. 2.

The flow chart 400 starts at step 402. At step 404, the user unification system 110 receives the first set of data associated with the first device of the first set of communication devices 204a. At step 406, the user unification system 110 maps the first set of data associated with the first device of the first set of communication devices 204a to the first natural number of the plurality of natural numbers. At step 408, the user unification system 110 assigns the first shard index of the plurality of shard index to the first set of data associated with the first device of the first set of communication devices 204a. At step 410, the user unification system 110 obtains the second set of data associated with the first user 202a of the one or more users 102. At step 412, the user unification system 110 maps the second set of data associated with the first user 202a of the one or more users 102 to the second natural number of the plurality of natural numbers. At step 414, the user unification system 110 unifies the first natural number and the second natural number to identify and associate the first device of the first set of communication devices 204a with the first user 202a. At step 416, the user unification system 110 assigns the first shard index of the plurality of shard indexes to the second set of data associated with the first user 202a of the one or more users 102.

The flow chart 400 terminates at step 418. It may be noted that the flowchart 400 is explained to have above stated process steps; however, those skilled in the art would appreciate that the flowchart 400 may have more/less number of process steps which may enable all the above stated embodiments of the present disclosure.

FIG. 5 illustrates the block diagram of a computing device 500, in accordance with various embodiments of the present disclosure. The computing device 500 includes a bus 502 that directly or indirectly couples the following devices: memory 504, one or more processors 506, one or more presentation components 508, one or more input/output (I/O) ports 510, one or more input/output components 512, and an illustrative power supply 514. The bus 502 represents what may be one or more busses (such as an address bus, data bus, or combination thereof). Although the various blocks of FIG. 5 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 5 is merely illustrative of an exemplary computing device 500 that can be used in connection with one or more embodiments of the present invention. Distinction is not made between such categories as "workstation," "server," "laptop," "hand-held device," etc., as all are contemplated within the scope of FIG. 5 and reference to "computing device."

The computing device 500 typically includes a variety of computer-readable media. The computer-readable media can be any available media that can be accessed by the computing device 500 and includes both volatile and non-volatile media, removable and non-removable media. By way of example, and not limitation, the computer-readable media may comprise computer storage media and communication media. The computer storage media includes volatile and nonvolatile, removable and non-removable media implemented in any method or technology for storage of information such as computer-readable instructions, data structures, program modules or other data.

The computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 500. The communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 504 includes computer-storage media in the form of volatile and/or nonvolatile memory. The memory 504 may be removable, non-removable, or a combination thereof. Exemplary hardware devices include solid-state memory, hard drives, optical-disc drives, etc. The computing device 500 includes one or more processors that read data from various entities such as memory 504 or I/O components 512. The one or more presentation components 508 present data indications to a user or other device. Exemplary presentation components include a display device, speaker, printing component, vibrating component, etc. The one or more I/O ports 510 allow the computing device 500 to be logically coupled to other devices including the one or more I/O components 512, some of which may be built in. Illustrative components include a microphone, joystick, game pad, satellite dish, scanner, printer, wireless device, etc.

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

While several possible embodiments of the invention have been described above and illustrated in some cases, it should be interpreted and understood as to have been presented only by way of illustration and example, but not by limitation. Thus, the breadth and scope of a preferred embodiment should not be limited by any of the above-described exemplary embodiments.

We claim:

1. A computer-implemented method for performing unification of data of one or more users across a plurality of communication devices in a plurality of shards, the computer-implemented method comprising:
   receiving, at a user unification system with a processor, a first set of data associated with a first device of a first set of communication devices, wherein the first set of communication devices is associated with a first user of the one or more users, wherein the first set of data corresponds to device identity of the first device of the first set of communication devices;
   mapping, at the user unification system with the processor, the first set of data associated with the first device of the first set of communication devices to a first natural number of a plurality of natural numbers, wherein the first natural number of the plurality of natural numbers is mapped for the first device of the first set of communication devices using an increment sequence method;
   assigning, at the user unification system with the processor, a first shard index of a plurality of shard indexes to the first set of data associated with the first device of the first set of communication devices based on the first natural number of the plurality of natural numbers, wherein the first shard index of the plurality of shard indexes facilitates storing of the first set of data in corresponding shard of the plurality of shards based on shard indexing process;
   obtaining, at the user unification system with the processor, a second set of data associated with the first user of the one or more users, wherein the first user of the one or more users utilizes the first set of communication devices for accessing one or more online platforms, wherein the second set of data corresponds to personal identity of the first user of the one or more users;
   mapping, at the user unification system with the processor, the second set of data associated with the first user of the one or more users to a second natural number of the plurality of natural numbers, wherein the second natural number of the plurality of natural numbers is mapped for the first user of the one or more users using the increment sequence method;
   unifying, at the user unification system with the processor, the first natural number and the second natural number for identifying and associating the first device of the first set of communication devices with the first user of the one or more users; and assigning, at the user unification system with the processor, the first shard index of the plurality of shard indexes to the second set of data associated with the first user of the one or more users, wherein the first shard index of the plurality of shard indexes facilitates storing of the second set of data in corresponding shard of the plurality of shards based on shard indexing process.

2. The computer-implemented method as claimed in claim 1, wherein the first set of data comprising mobile equipment identifier (MEID), international mobile equipment identity (IMEI), electronic serial number (ESN), international mobile subscriber identity (IMSI), media access control address (MAC address), and internet protocol address.

3. The computer-implemented method as claimed in claim 1, wherein the second set of data comprising name data, age data, electronic mail identity data, folio number data, policy identity data, unique user identity data, contact number data, gender data, geographical location data, and demographical data.

4. The computer-implemented method as claimed in claim 1, wherein the one or more online platforms comprising an over-the top media platform, an e-commerce platform, a fintech platform, a social media platform, a health platform, an educational platform, a real estate and housing platform, and a travel platform.

5. The computer-implemented method as claimed in claim 1, wherein the increment sequence method enables generation of a natural number of the plurality of natural numbers in incremented way in a number sequence, wherein the increment sequence method enables the user unification system for automating mapping of the first set of data and the second set of data in real-time.

6. The computer-implemented method as claimed in claim 1, wherein shard indexing process enables the user unification system to store the first set of data associated with the first device of the first set of communication devices and the second set of data associated with the first user of the one or more users in same shard of the plurality of shards, wherein shard indexing process utilizes modulo operation on the first set of data and the second set of data for allocating corresponding shard of the plurality of shards.

7. The computer-implemented method as claimed in claim 1, further comprising fetching, at the user unification system with the processor, a third set of data associated with at least one other communication device of the first set of communication devices, wherein the third set of data corresponds to device identity of the at least one other communication device of the first set of communication devices, wherein the user unification system maps the third set of data associated with the at least one other communication device of the first set of communication devices to a third natural number of the plurality of natural numbers, wherein the third natural number of the plurality of natural numbers is mapped for the at least one other communication device of the first set of communication devices using the increment sequence method, wherein the user unification system unifies the third natural number with the first natural number and the second natural number for identifying and associating the at least one other communication device of the first set of communication devices with the first user of the one or more users, wherein the user unification system assigns the first shard index of the plurality of shard indexes to the third set of data associated with the at least one other communication device of the first set of communication devices, wherein the first shard index of the plurality of shard indexes facilitates storing of the third set of data in corresponding shard of the plurality of shards based on shard indexing process.

8. A computer system comprising:
one or more processors; and
a memory coupled to the one or more processors, the memory for storing instructions which, when executed by the one or more processors, cause the one or more processors to perform a method for performing unification of data of one or more users across a plurality of communication devices in a plurality of shards, the method comprising:

receiving, at a user unification system, a first set of data associated with a first device of a first set of communication devices, wherein the first set of communication devices is associated with a first user of the one or more users, wherein the first set of data corresponds to device identity of the first device of the first set of communication devices;

mapping, at the user unification system, the first set of data associated with the first device of the first set of communication devices to a first natural number of a plurality of natural numbers, wherein the first natural number of the plurality of natural numbers is mapped for the first device of the first set of communication devices using an increment sequence method;

assigning, at the user unification system, a first shard index of a plurality of shard indexes to the first set of data associated with the first device of the first set of communication devices based on the first natural number of the plurality of natural numbers, wherein the first shard index of the plurality of shard indexes facilitates storing of the first set of data in corresponding shard of the plurality of shards based on shard indexing process;

obtaining, at the user unification system, a second set of data associated with the first user of the one or more users, wherein the first user of the one or more users utilizes the first set of communication devices for accessing one or more online platforms, wherein the second set of data corresponds to personal identity of the first user of the one or more users;

mapping, at the user unification system, the second set of data associated with the first user of the one or more users to a second natural number of the plurality of natural numbers, wherein the second natural number of the plurality of natural numbers is mapped for the first user of the one or more users using the increment sequence method;

unifying, at the user unification system, the first natural number and the second natural number for identifying and associating the first device of the first set of communication devices with the first user of the one or more users; and assigning, at the user unification system, the first shard index of the plurality of shard indexes to the second set of data associated with the first user of the one or more users, wherein the first shard index of the plurality of shard indexes facilitates storing of the second set of data in corresponding shard of the plurality of shards based on shard indexing process.

9. The computer system as claimed in claim 8, wherein the first set of data comprising mobile equipment identifier (MEID), international mobile equipment identity (IMEI), electronic serial number (ESN), international mobile subscriber identity (IMSI), media access control address (MAC address), and internet protocol address.

10. The computer system as claimed in claim 8, wherein the second set of data comprising name data, age data, electronic mail identity data, contact number data, folio number data, policy identity data, unique user identity data, gender data, geographical location data, and demographical data.

11. The computer system as claimed in claim 8, wherein the one or more online platforms comprising an over-the top media platform, an e-commerce platform, a fintech platform, a social media platform, a health platform, an educational platform, a real estate and housing platform, and a travel platform.

12. The computer system as claimed in claim 8, wherein the increment sequence method enables generation of a natural number of the plurality of natural numbers in incremented way in a number sequence, wherein the increment sequence method enables the user unification system for automating mapping of the first set of data and the second set of data in real-time.

13. The computer system as claimed in claim 8, wherein shard indexing process enables the user unification system to store the first set of data associated with the first device of the first set of communication devices and the second set of data associated with the first user of the one or more users in same shard of the plurality of shards, wherein shard indexing process utilizes modulo operation on the first set of data and the second set of data for allocating corresponding shard of the plurality of shards.

14. The computer system as claimed in claim 8, further comprising fetching, at the user unification system, a third set of data associated with at least one other communication device of the first set of communication devices, wherein the third set of data corresponds to device identity of the at least one other communication device of the first set of communication devices, wherein the user unification system maps the third set of data associated with the at least one other communication device of the first set of communication devices to a third natural number of the plurality of natural numbers, wherein the third natural number of the plurality of natural numbers is mapped for the at least one other communication device of the first set of communication devices using the increment sequence method, wherein the user unification system unifies the third natural number with the first natural number and the second natural number for identifying and associating the at least one other communication device of the first set of communication devices with the first user of the one or more users, wherein the user unification system assigns the first shard index of the plurality of shard indexes to the third set of data associated with the at least one other communication device of the first set of communication devices, wherein the first shard index of the plurality of shard indexes facilitates storing of the third set of data in corresponding shard of the plurality of shards based on shard indexing process.

15. A non-transitory computer-readable storage medium encoding computer executable instructions that, when executed by at least one processor, performs a method for performing unification of data of one or more users across a plurality of communication devices in a plurality of shards, the method comprising:
    receiving, at a computing device, a first set of data associated with a first device of a first set of communication devices, wherein the first set of communication devices is associated with a first user of the one or more users, wherein the first set of data corresponds to device identity of the first device of the first set of communication devices;
    mapping, at the computing device, the first set of data associated with the first device of the first set of communication devices to a first natural number of a plurality of natural numbers, wherein the first natural number of the plurality of natural numbers is mapped for the first device of the first set of communication devices using an increment sequence method;
    assigning, at the computing device, a first shard index of a plurality of shard indexes to the first set of data associated with the first device of the first set of communication devices based on the first natural number of the plurality of natural numbers, wherein the first shard index of the plurality of shard indexes facilitates storing of the first set of data in corresponding shard of the plurality of shards based on shard indexing process;
    obtaining, at the computing device, a second set of data associated with the first user of the one or more users, wherein the first user of the one or more users utilizes the first set of communication devices for accessing one or more online platforms, wherein the second set of data corresponds to personal identity of the first user of the one or more users;
    mapping, at the computing device, the second set of data associated with the first user of the one or more users to a second natural number of the plurality of natural numbers, wherein the second natural number of the plurality of natural numbers is mapped for the first user of the one or more users using the increment sequence method;
    unifying, at the computing device, the first natural number and the second natural number for identifying and associating the first device of the first set of communication devices with the first user of the one or more users; and
    assigning, at the computing device, the first shard index of the plurality of shard indexes to the second set of data associated with the first user of the one or more users, wherein the first shard index of the plurality of shard indexes facilitates storing of the second set of data in corresponding shard of the plurality of shards based on shard indexing process.

* * * * *